US007421592B1

(12) United States Patent
Kadatch et al.

(10) Patent No.: US 7,421,592 B1
(45) Date of Patent: Sep. 2, 2008

(54) HIGH PERFORMANCE COUNTER FOR REALISTIC MEASUREMENT OF COMPUTER SYSTEM LOAD

(75) Inventors: Andrew Kadatch, Redmond, WA (US);
James E. Walsh, Woodinville, WA (US);
Stuart R. Patrick, Bellevue, WA (US);
Xiaowen Shan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 10/779,299

(22) Filed: Feb. 13, 2004

(51) Int. Cl.
*G06F 1/00* (2006.01)
(52) U.S. Cl. .................................. 713/300; 707/10
(58) Field of Classification Search .................. 707/10; 713/300
See application file for complete search history.

(56) References Cited

U.S. PATENT DOCUMENTS

| | | | |
|---|---|---|---|
| 4,905,171 A * | 2/1990 | Kiel et al. .................... 702/186 |
| 5,432,932 A | 7/1995 | Chen et al. |
| 5,493,673 A * | 2/1996 | Rindos et al. ............... 713/502 |
| 5,506,955 A | 4/1996 | Chen et al. |
| 5,796,939 A * | 8/1998 | Berc et al. .................... 714/47 |
| 5,872,913 A * | 2/1999 | Berry et al. ................... 714/47 |
| 6,049,798 A * | 4/2000 | Bishop et al. ................. 707/10 |
| 6,178,529 B1 | 1/2001 | Short et al. |
| 6,374,367 B1 * | 4/2002 | Dean et al. .................... 714/37 |
| 6,553,403 B1 | 4/2003 | Jarriel et al. |
| 6,609,083 B2 * | 8/2003 | Enck et al. .................... 702/186 |
| 6,691,067 B1 * | 2/2004 | Ding et al. .................... 702/186 |
| 6,976,193 B2 * | 12/2005 | Dubal ........................... 714/47 |
| 2002/0183972 A1 * | 12/2002 | Enck et al. .................... 702/186 |
| 2004/0267691 A1 * | 12/2004 | Vasudeva ....................... 707/1 |

OTHER PUBLICATIONS

F. Chang and V. Karamcheti. Automatic configuration and run-time adaptation of distributed applications. In 9th IEEE Init. Symp. on High Performance Distributed Computing, Aug. 2000. 18 pages.
C. Poellabauer, H. Abbasi, and K. Schwan. Cooperative run-time management of adaptive applications and distributed resources. In Proceedings of the 10th ACM Multimedia Conference, pp. 402-411, 2002.
F.J. Da Silva E Silva, M. Endler, and F. Kon. Dynamic adaptation of distributed systems. 16th European Conference on Object-Oriented Programming, Jun. 2002. 6 pages.

* cited by examiner

*Primary Examiner*—Thomas C. Lee
*Assistant Examiner*—Vincent T Tran
(74) *Attorney, Agent, or Firm*—Amin, Turocy & Calvin, LLP

(57) ABSTRACT

The present invention leverages high-frequency interrupts and/or low priority threads to accurately determine which computing resources are available. This provides a computing asset (CPUs and/or software applications) with a means to accurately compensate for resource utilization in order to increase its performance. By utilizing the present invention, the computing asset can optimize its performance in a real-time, self-tuning manner. In one instance of the present invention, high intensity, low priority threads are initiated on available CPUs (logical and/or physical) to effectively replace a CPU's idle time with the low priority thread. This thread generally constitutes a computationally-intensive and/or a memory-intensive thread which permits a highly accurate performance measurement to be obtained for available CPU resources. In another instance of the present invention, high-frequency interrupts are initiated on CPUs to compensate for processes that are shorter than a thread's time quantum, providing a more accurate performance counter.

17 Claims, 10 Drawing Sheets

HIGH PERFORMANCE COUNTER FOR REALISTIC MEASUREMENT OF COMPUTER SYSTEM LOAD

TECHNICAL FIELD

The present invention relates generally to computing performance, and more particularly to systems and methods for determining real-time availability of computing resources.

BACKGROUND OF THE INVENTION

Computers have become an essential part of our everyday lives. They have the capability to process information quickly and accurately. Because of this, society has embraced utilizing computers for critical needs such as banking, space flight, medical care, and air traffic control and the like. Thus, a computer's speed and accuracy are paramount in these types of critical transactions. These characteristics have also been embraced, however, by people expecting the same great performance from computers in non-critical applications such as for large information storage and retrieval systems. Thus, programs, such as database programs and the like, that execute high numbers of transactions per second also require high performance computing systems. These extreme demands on computing systems have driven great gains in the area of computing performance.

A computing system is generally composed of hardware and software components that interact with each other. The hardware components can be described generally as those parts of the computing system that a person can physically touch. These include processors, memory chips, hard drives, connecting wires and traces, and other supporting hardware devices. Typically, the processing hardware components are constructed so that they can recognize two logical states, namely a "0" state (or low electrical state) and a "1" state (or high electrical state). Employing a number of these states together in a sequence allows data to be stored and processed by the hardware. The software components contain instruction sets that utilize the hardware to accomplish a particular task. They are typically written in "code" that is a high level software language for representing the desired zeroes and ones (or "low" and "high" states). In this manner, software can be written to accurately control the hardware components to return a desired effect.

As can be expected as technology progresses, the lines between what is hardware and what is software tends to blur a little. Thus, the concept of "firmware" arises where the name indicates that it is not quite hardware but also not quite software. Generally speaking, firmware is ones and zeroes that reside in somewhat of a permanent state on a hardware component to allow control of the hardware at a low level or "root" level. It is considered "firm" because it does not change often and is utilized for a particular type of hardware component or platform. Firmware typically handles hardware specific interfaces and the startup sequences of the hardware components.

When computing systems were first developed, it was desirable to have some common software that could handle reading and writing to hard drives and some basic repetitive tasks necessary to operate the computing system. These included diagnostics, data file structures, and human-machine interfaces. A disk operating system was developed initially to handle file structures and basic interfaces. This progressed into what is known today as an "operating system." Gone are text based user-interfaces, and now graphical user interfaces ("GUI") are considered the norm. Thus, the disk operating system has developed into a full blown, user-oriented operating system that provides a greater amount of flexibility, ease of use, and control over a computing system than was previously achievable.

With fast hardware and an easy to use operating system, all that is needed is a way to get the computing system to behave in a way that gives a desired result. This could be achieved by continuously altering an operating system. However, people typically have different tasks that they want a computing system to perform. So, the operating system remains "common" software and additional task specific software is written to perform those specific tasks, called "application" software (or executable software). For example, if users want to balance their checkbook, they can install financial application software on their computing system and perform that task. Thus, having application software allows the computing system to expand its tasking capabilities without changing its hardware components and/or operating system. Utilizing this type of hardware and software architectural structure allows almost infinite task capability for a given computing system.

The typical limitations on a computing system's task capability are generally dictated by its processor speed. The amount of information and how fast a computing system can handle it usually indicates the performance that the system is capable of achieving. Therefore, increasing the performance of a computing system allows it to be more flexible and to do more work. This can be accomplished in any one of the architectural levels of a computing system. Thus, strides have been made in optimizing hardware components and also software components for speed. As competing hardware manufacturers have introduced new and different hardware architectures for increased performance, often times operating systems and even applications must change also to utilize those changes before performance gains can be realized.

One of the first areas of hardware performance gains was in introducing a data "cache." This allowed frequently used data to be available quickly to hardware processing components, increasing their speed. Eventually, multi-leveled caches were developed and some even placed on a semiconductor die ("onboard" cache) along with the processor to achieve even faster response times. Along with optimizing frequently used data retrieval, manufacturers also worked on increasing the processing speed itself. Processor semiconductor chips were shrunk dramatically in size and new materials were used to get even smaller sized chips. This allowed extremely fast state (zeroes and ones) changes within the processors. Today, processor speeds have reached beyond 3 gigahertz levels with front side bus speeds well over 500 megahertz. Increasing the bus (or "connection") speed allows the processors to access "off-board" cache faster, facilitating the processor speed.

Typically, increasing a processor's speed may not require extensive changes to an operating system nor to applications that run on a computing system. These types of changes are generally "overall" performance increases that mean faster processing even with unchanged software. Unfortunately, there are physical limitations to this type of performance increase. Semiconductor sizes are nearing atomic levels where eventually it will not be possible to go any smaller. This has created a push in architectural optimization to increase processing in a computing system. Hardware manufacturers have begun to develop computing platforms (systems) with multiple processors instead of just a single processor. They have also introduced single physical packages that contain multiple processing cores in what used to be only a single processor core. Additionally, recent trends have produced processors with multiple "logical" processors that are utilized, for example, in simultaneous multi-threading. These logical processors are not physical processors, but appear as such from a user's perspective. They typically share functional resources such as adders and memory and the like. Caches have begun to be shared between both physical and logical processors. Buses have also been utilized as shared resources for performance gains. Thus, the hardware components in a computing system have grown quite complex in their architecture and can vary greatly with each computing platform.

This newer breed of enhanced platform optimization requires changes in software to fully realize the platform's potential. The reason for this is the introduction of multiple processing entities, whether they are physical and/or logical entities. A software application can often increase its performance by utilizing more than one processing entity. This is not always the case because it requires that an application have internal processes that do not require a serial process (i.e., one action must always precede another action in sequence) in order to allow multiple processes to execute at the same time. An application must also be aware that it has access to a platform with multiple processing entities. It must also have its code written so that it can optimize itself based upon a particular processing architecture. Obviously, this requires changes to the software application before a user will obtain increased performance.

Because of the constant need to increase computing system speeds, it is very likely that performance strides will continue to be made. Therefore, it is unlikely that only existing hardware architectures utilized today will be the only ones used in the future. Thus, it is more likely that even higher complexity architectures will be developed with even more varying combinations. This will also drive to increase the complexity of the software applications in order for them to adequately exploit the hardware architecture to fully optimize their application's performance. With this newfound increase in complexity comes an increase in difficulty in extracting the maximum performance of both the software and hardware. Although each can be optimized for speed, performance monitoring to evaluate optimal utilization must also be capable of keeping pace with the performance increases of both hardware and software. Today, typically, performance can only be monitored by keeping track of idle times and spot checking memory utilization. Multiple logical CPUs and their shared resources only compound the difficulty of tracking resource utilization. Often averages are utilized to estimate total resource usage, resulting in too little utilization or allowing more processes than can be handled by the computing resources.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to computing performance, and more particularly to systems and methods for determining real-time availability of computing resources. High-frequency interrupts and/or low priority threads are leveraged to more accurately determine which resources are available for computing. This provides a computing asset, such as a central processing unit (CPU) and/or a software application and the like, with a means to accurately compensate for resource utilization in order to increase its performance. By utilizing the present invention, the computing asset can optimize its performance in a real-time, self-tuning manner. In one instance of the present invention, high intensity, low priority threads are initiated on available CPUs (logical and/or physical) to effectively replace a CPU's idle time with the low priority thread. The low priority thread generally constitutes a computationally intensive and/or a memory intensive thread which permits a highly accurate performance measurement to be obtained for available CPU resources. In another instance of the present invention, high-frequency interrupts are initiated on available CPUs to compensate in performance analyses for processes that are shorter than a thread's time quantum, providing a more accurate performance counter. The present invention allows for better exploitation of available computing resources for hardware and/or software related computing assets, permitting "on-the-fly" or real-time adjustments to further enhance performance.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
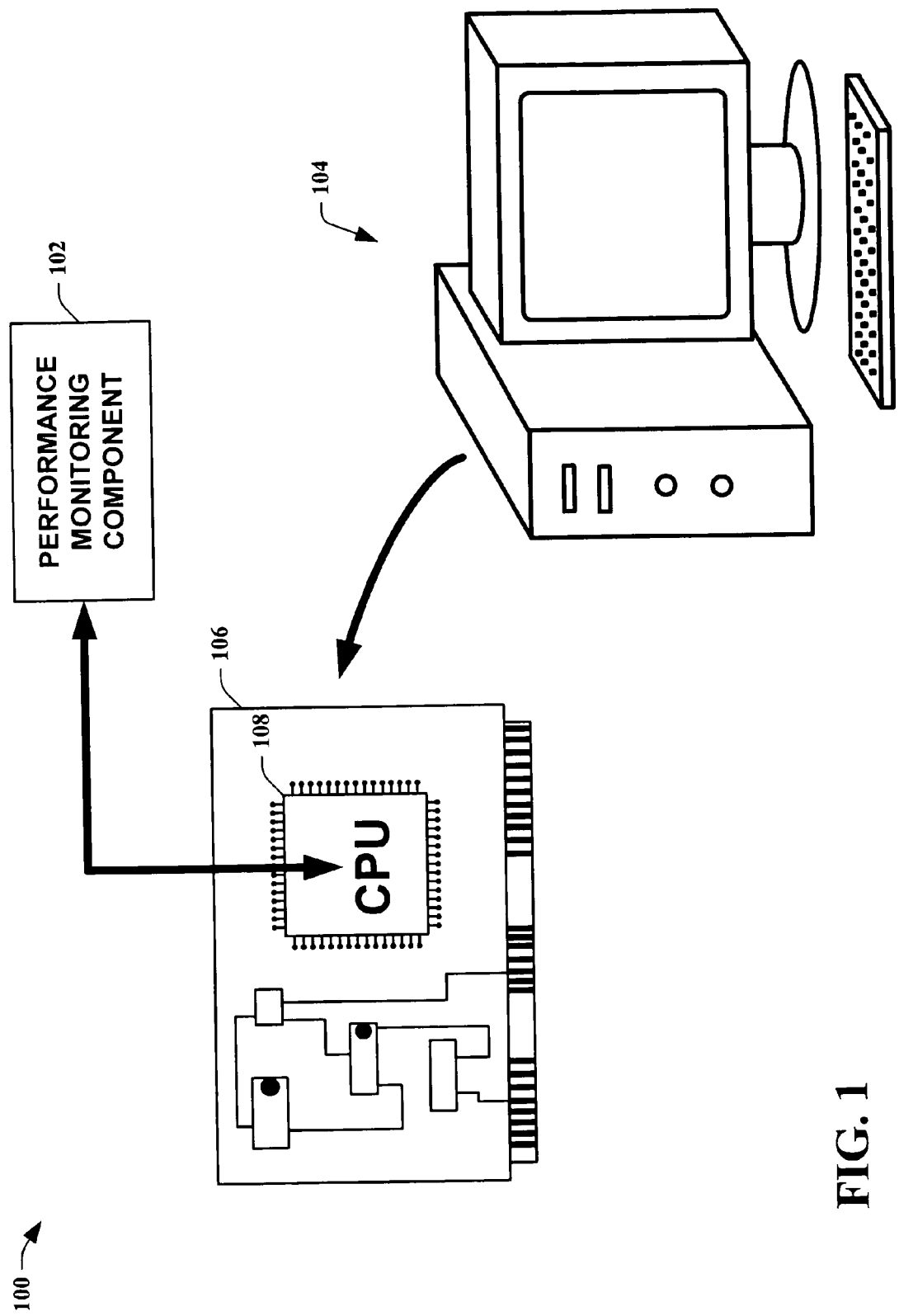
FIG. 1 is a block diagram of a performance monitoring system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides a central processing unit (CPU) loading means for more accurately measuring CPU utilization, software application performance management, and operating system (OS) performance management and the like. In one instance of the present invention, utilization of a high-resolution interrupt-based measurement mechanism provides for a very efficient and very precise means to determine available resources. When combined with a set of low-priority, computationally- and memory-intensive threads, it gives an accurate and precise picture of application and system behavior during CPU multitasking. The set of low-priority threads can also be utilized separately to provide loading of CPU resources to determine which resources are available. Information relating to available resources can then be utilized by operating systems and software applications alike to optimize their performance on a dynamic basis.

Performance of any software product is critical for its success. It is the feature that users tend to notice first, and it's the easiest feature to market. Therefore, the task of finding and resolving performance problems is extremely important for a marketable product. The CPU is one of the most important computer resources, and CPU utilization by a product is one of most critical performance metrics. The task of measuring an amount of CPU utilized by a product is a non-trivial task. It is complicated even further when the CPU utilization needs to be measured during multitask processing due to other programs running on a system.

To facilitate developers in monitoring CPU utilization, a typical operation system measures time spent in each process and thread by measuring the time when it gives control to the process/thread and takes it back. Although in most cases this approach works well, it's not the best solution for the following reasons. First, it does not account for background activity during interrupts when normal program execution is interrupted by an external signal (e.g., IO completion notification from a hard disk or a network card) and special interrupt handling code is executed, temporarily interrupting normal execution flow (similarly to a phone call interrupting, for a while, a process of reading a book). Second, the resolution of a system clock, typically 60 Hz, is insufficient for many purposes. If a program has short and frequent spikes of activity, an elapsed time measurement is substantially smaller than the actual amount of time spent by the program (e.g., if home wall clocks would show only hours, accounting for frequent activities of small duration would be hard, if possible at all). It should be noted that an operation system cannot increase frequency of a system clock because it quickly drains the battery installed in a computer and unnecessarily increases system overhead (most of the time high precision is not required). Third, when a system has no active operations (i.e., when all running programs and threads are waiting for IO completion and/or user input), it temporarily stops a CPU that is waiting for a signal enabling further activity (e.g., IO completion, key press, or mouse movement). Since the CPU is not performing when it's idle, overall system utilization is may seem low, creating an illusion that considerable computational resources are available. However, if there is another activity that must compete with other processes and threads, the amount of resources it actually receives can be substantially lower than expected because such multitasking actually negatively affects CPU cache (e.g., time must be spent refilling the cache, etc.) and slows down other processes. For example, a system running on dual-processor machine fully utilizing only one CPU (so that a second CPU is in idle state most of the time) may think that, since CPU utilization is apparently only 50% as shown by the current CPU counters, it can double its throughput by accepting twice as many clients and/or requests; however, when it will start utilizing the second CPU, it may turn out that because of interference the actual increase in the amount of workload the system can handle is, say, 30%, not 100%. Thus, an attempt to estimate overall system capacity using default CPU utilization figures may prove totally wrong and lead to system over-utilization and, consequently, poor user experience caused by late/lost packets, timeouts, excessive response latency, etc. This is especially important for multi-thread technology that utilizes two or more CPUs on the same die and shares a single memory cache. On such CPUs, other programs executing on another CPU on the same die can noticeably degrade performance of a common memory cache for a particular thread and considerably affect overall performance of software applications. During typical usage of a computing device, processing resource competition is very likely from software applications such as, for example, virus checkers, email programs, and other installed programs running in the background. Thus, realistic performance measurements require accurate accounting of CPU utilization during multitask processing. Fourth, in a situation when a system is idle and/or when there are other executable threads/processes that are very different from the point of view of a system scheduler (i.e., a component that decides what threads/processes shall be executed and when), typical performance measurement techniques are very inaccurate. To be exact, a system scheduler tries hard to improve overall system productivity by minimizing the amount of context switches (i.e., transfers of CPU ownership from one thread/process to another) because each context switch is: (a) a non-trivial operation that takes some amount of time and (b) each context switch degrades performance of the CPU cache for a particular application. Thus, if there are too many context switches, the CPU efficiency degrades dramatically because it is limited to waiting for main memory. In order to minimize the amount of context switches, a system scheduler tries to let a current thread execute as long as possible, until its time quantum expires. Therefore, if an operation system receives a signal enabling execution of a suspended program/thread when it is in an idle state, it resumes the suspended program/thread immediately. However, when the operation system receives such a signal while executing another program task, it does not resume the suspended program/thread immediately. Instead, it first lets the other program exhaust its time quantum. Thus, behavior and timing of both system and all programs it executes during multitask processing changes substantially.

In FIG. 1, a block diagram of a performance monitoring system 100 in accordance with an aspect of the present invention is shown. The performance monitoring system 100 is comprised of a performance monitoring component 102. The performance monitoring component 102 resides within a computing system 104 and monitors performance of a CPU 108 mounted on a motherboard 106 that is contained within the computing system 104. In this instance of the present invention, the performance monitoring component 102 is monitoring only a single CPU. However, other instances of the present invention can monitor a plurality of CPUs. The performance monitoring component 102 can be embedded into an operating system within the computing system 104 and/or can be a linkable component of an operating system such as a dynamically linked library (DLL) and the like. The performance monitoring component 102 monitors the CPU 108 for performance by accurately measuring available resources utilizing low-priority threads with memory- and/or computationally-intensive operations and/or high-frequency interrupts that task the CPU 108 in a dynamic manner.

Figure 2:
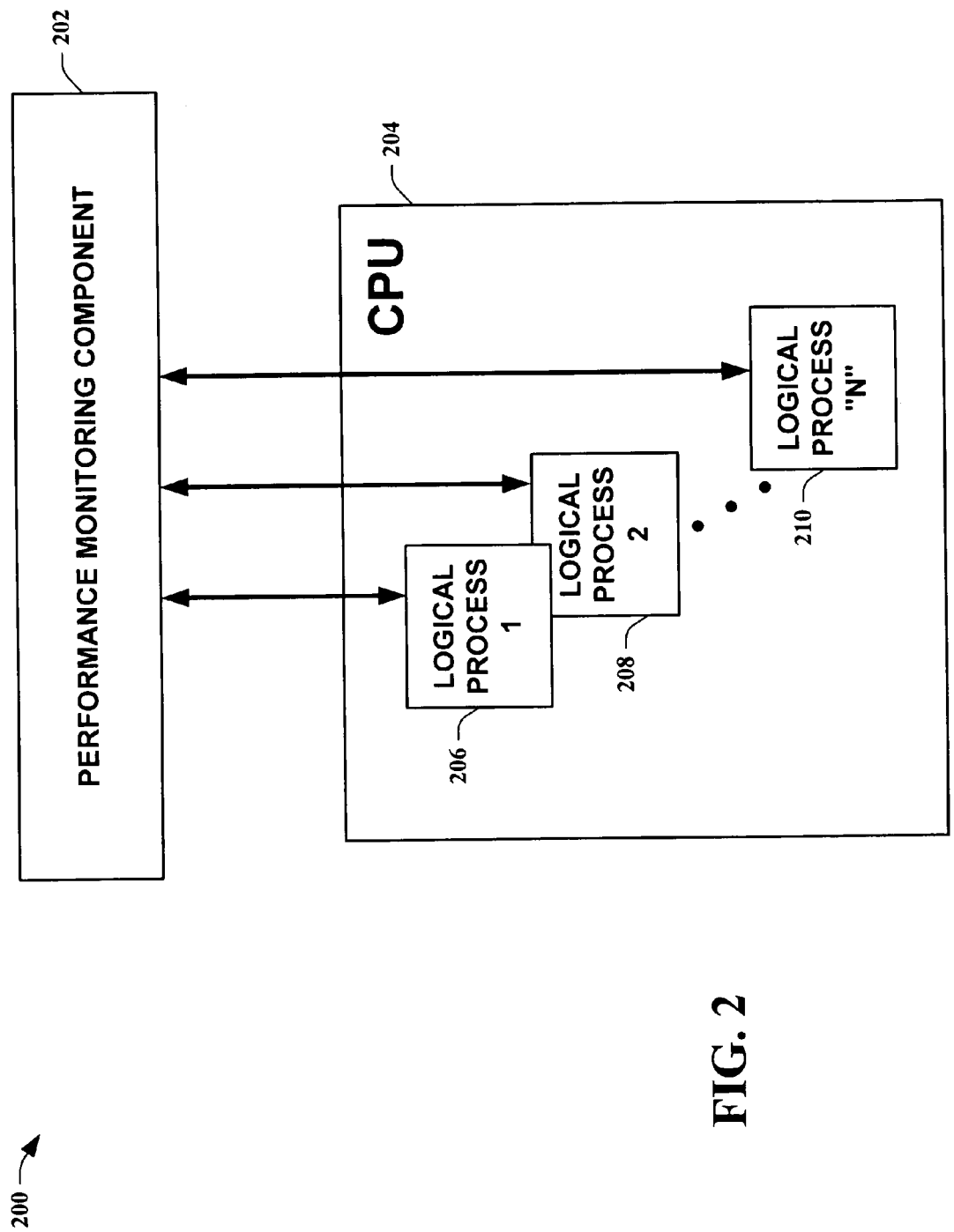
FIG. 2 is another block diagram of a performance monitoring system in accordance with an aspect of the present invention.

Referring to FIG. 2, another block diagram of a performance monitoring system 200 in accordance with an aspect of the present invention is illustrated. The performance monitoring system 200 is comprised of a performance monitoring component 202. The performance monitoring component 202 monitors a CPU 204. In this instance of the present invention, the CPU 204 is comprised of a plurality of logical processes 1-N 206-210, where N represents any integer from one to infinity. The logical processes 1-N 206-210 create virtual CPUs that appear as different physical CPUs to software applications. These logical processes 1-N 206-210, however, still share a common physical processor and common physical memory. Thus, loading on each of the logical processes 1-N 206-210 affects the other logical processes 1-N 206-210. The performance monitoring component 202 tracks multiple CPU performance whether it is a virtual CPU or a physical CPU. Thus, the performance monitoring component 202 can initiate low-priority threads and/or initiate high-frequency interrupts in each of the logical processes 1-N 206-210. Likewise, in another instance of the present invention, the performance monitoring component 202 can interface with a plurality of separate physical CPUs (not shown) and/or a plurality of physical CPUs on a common die (not shown).

Figure 3:
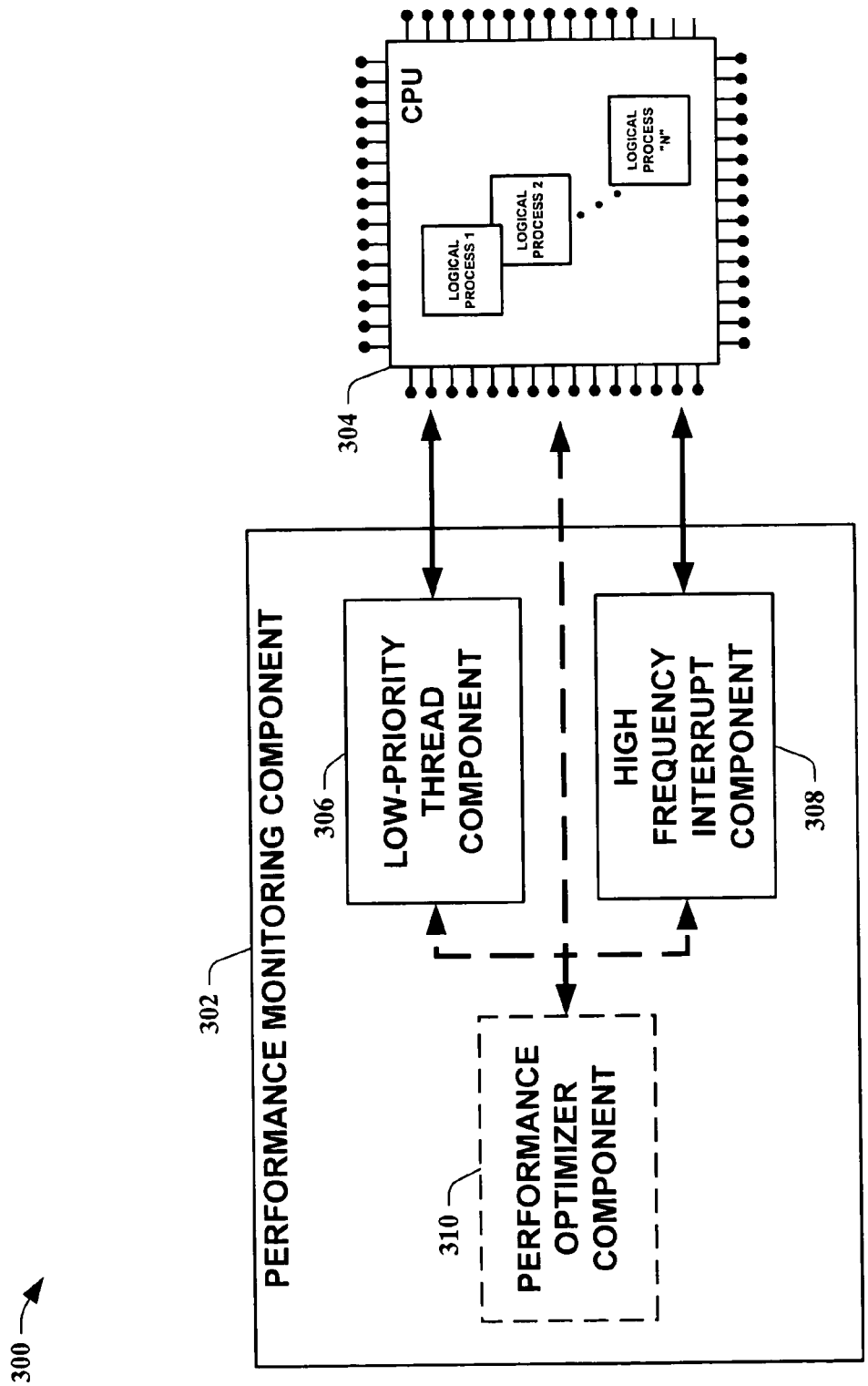
FIG. 3 is yet another block diagram of a performance monitoring system in accordance with an aspect of the present invention.

Turning to FIG. 3, yet another block diagram of a performance monitoring system 300 in accordance with an aspect of the present invention is depicted. The performance monitoring system 300 is comprised of a performance monitoring component 302. The performance monitoring component 302 interfaces with a CPU 304. It 302 is comprised of a low-priority thread component 306, a high-frequency interrupt component 308, and an optional performance optimizer component 310. The low-priority thread component 306 initiates threads in the CPU 304 that are memory-intensive and/or computationally-intensive operations. The high-frequency interrupt component 308 initiates timer-based, high-frequency interrupts in the CPU 304. In other instances of the present invention, the performance monitoring component 302 can be comprised solely of the low-priority thread component 306 or solely of the high-frequency interrupt component 308. The optional performance optimizer component 310 can interface with the low-priority thread component 306 and/or the high-frequency interrupt component 308 to sufficiently task the CPU 304 for performance optimizing. Performance related information obtained from the CPU 304 can be disseminated to software applications and/or an operating system by the performance optimizer component 310 to facilitate in optimizing their performance as well. In other instances of the present invention, performance and/or resource availability is disseminated directly to computing assets (e.g., CPUs, software applications, operating systems, etc.) via the low-priority thread component 306 and/or the high-frequency interrupt component 308.

Figure 4:
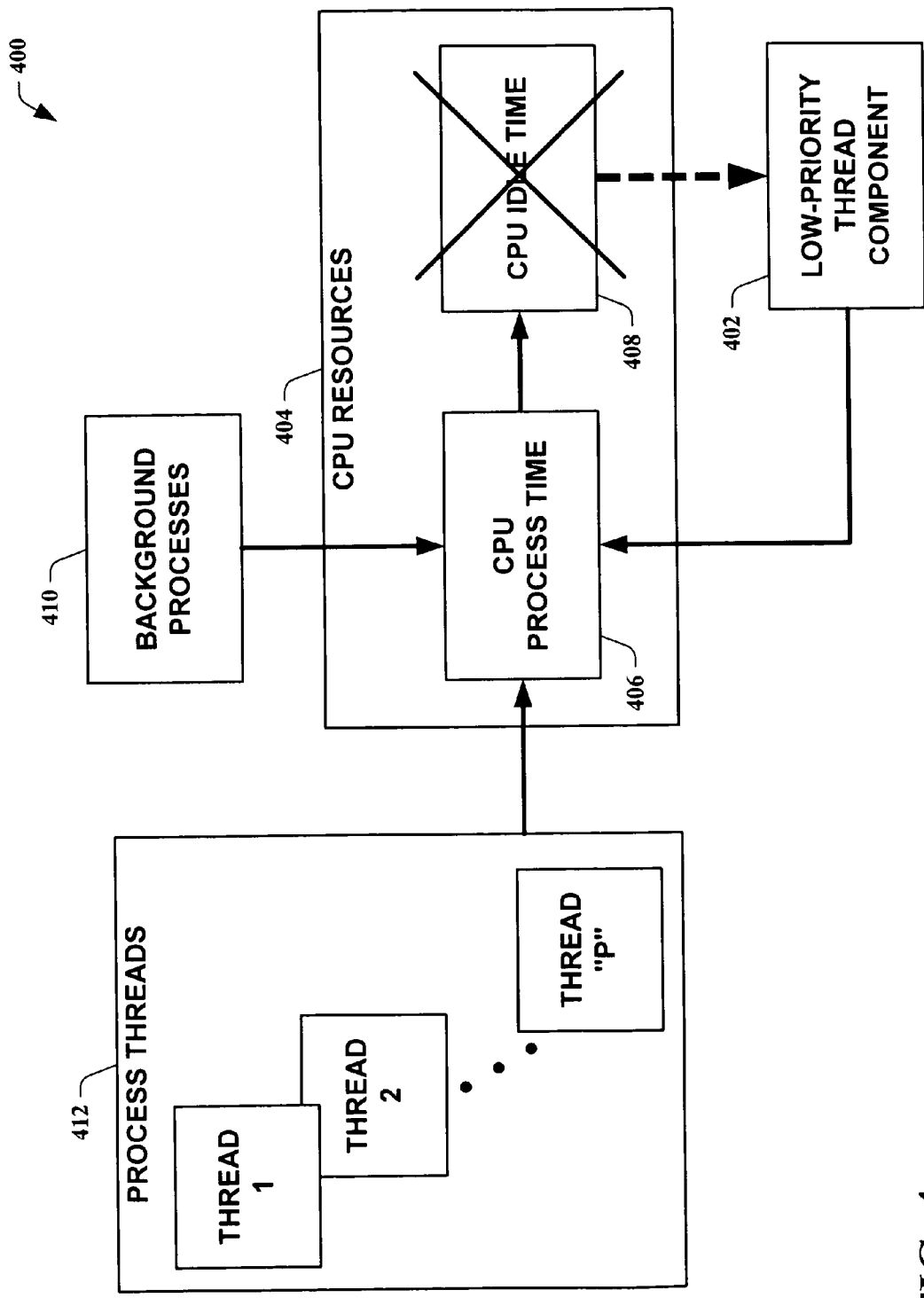
FIG. 4 is a block diagram of low priority thread performance monitoring system in accordance with an aspect of the present invention.

Thus, the present invention provides a means to obtain computing resource availability despite complex conditions that might exist for logical and/or physical CPUs. Instead of letting an operation system run an idle loop, at least one thread of a very low priority is initiated so that there is only one such thread running on each logical/physical CPU. Each such thread, optimally, executes computationally- and memory-intensive code (e.g., each thread runs a memory verification test which satisfies both conditions). Since these threads are of a very low priority, for example, one point above system idle, the threads do not typically prevent regular process threads from executing. And, because priority of these threads is generally just above system idle code, these threads gain control only when there are no other higher priority executable threads/processes. In this way, the low-priority threads essentially substitute for the system idle thread. This is illustrated in FIG. 4 where a block diagram of a low-priority thread performance monitoring system 400 in accordance with an aspect of the present invention is shown. The low-priority thread performance monitoring system 400 is comprised of a low-priority thread component 402. This component 402 interfaces with CPU resources 404. The CPU resources 404 must handle incoming process threads 412 and also any background processes 410. Typically, the CPU resources 404 have a CPU process time 406 that indicates when a CPU is actively processing. The CPU resources 404 also typically have a CPU idle time 408 that indicates when the CPU resources are not being utilized. In the present invention, the low-priority thread component 402 initiates low-priority processes such that the CPU process time 406 runs constantly, effectively eliminating the CPU idle time 408 (denoted by being "X'd out"). A dashed line from the CPU idle time 408 to the low-priority thread component 402 is representative of the fact that the CPU idle time 408 is replaced with low-priority threads by the low-priority thread component 402. Thus, the use of low-priority threads performing computationally- and memory-intensive operations facilitates in enhancing performance resolution to optimize CPU resources 404.

Figure 5:
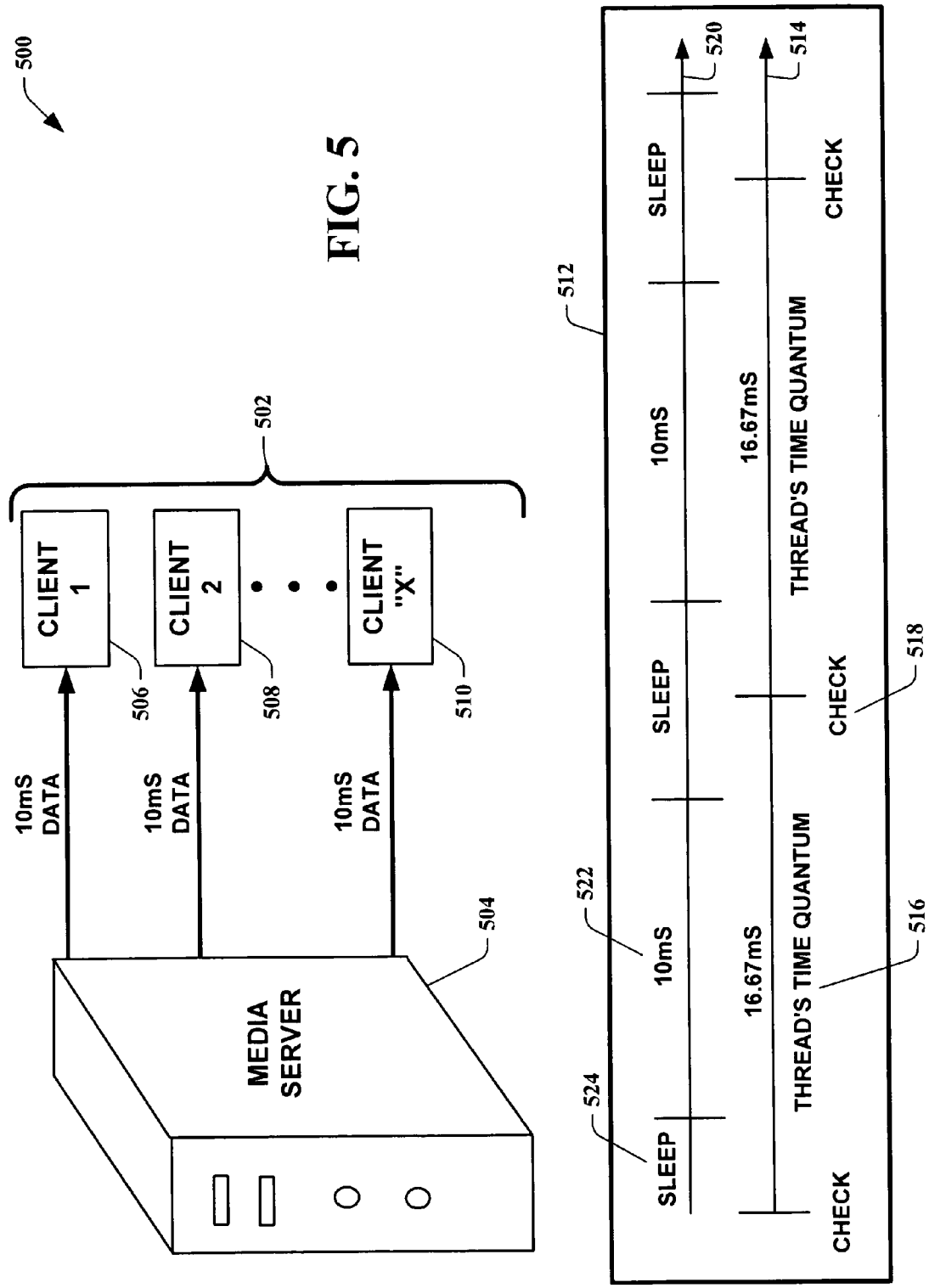
FIG. 5 is an illustration of high-frequency interrupt monitoring in accordance with an aspect of the present invention.

In order to measure time accurately, with high precision, one instance of the present invention utilizes timer-based, high-frequency (e.g., approximately 1 KHz or more) interrupts. When such an interrupt occurs, an interrupt handler determines what program code in a CPU was interrupted. Thus, by having the interrupt handler look at a much greater rate than a system clock, a more accurate representation of the utilization of a CPU can be obtained at any given moment. In FIG. 5, an illustration 500 of high-frequency interrupt monitoring in accordance with an aspect of the present invention is depicted. The illustration 500 shows a media server system 502 and a timing table 512. In this example, the media server system 502 is comprised of a media server 504 and clients 1-X 506-510, where X represents any integer from one to infinity. During its typical operation, the media server 504 wakes and sends data to a client for 10 milliseconds. It 504 then goes back to sleep. This cycle continues such that each of the clients 1-X 506-510 is serviced with 10 milliseconds of data at an intermittent interval. The timing table 512 illustrates via a bottom timing thread 514 a media server process thread's time quantum 516 and check points 518 at which time checks are made to determine if a media server process thread is running. The shortest quantum duration that can be checked by a typical system is determined by a system clock which generally operates at 60 Hz. This yields the shortest possible check period or the thread's quantum period 516 of approximately 16.67 milliseconds. Thus, checks 518 can only be accomplished every 16.67 milliseconds. A top timing thread 520 indicates actual media server thread duration 522 (i.e., 10 milliseconds) and the media server's sleep periods 524. As can be seen from FIG. 5, the checks 518 are made during the sleep periods 524 of the media server 504. Thus, utilizing a typical system clock, it appears to the system that the media server 504 is not operating at all. A typical performance monitor under these conditions would report that a CPU is idle and 100% available for work. This would, however, be incorrect as the media server 504 is actually utilizing the CPU for 10 millisecond data bursts at a consistent but intermittent rate that is undetectable by the typical performance monitor. By utilizing an instance of the present invention, high-frequency interrupts (e.g., approximately 300 Hertz or greater) are sent to the CPU so that it determines at a much higher frequency whether or not an application is running and, therefore, utilizing CPU resources. In the example shown in FIG. 5, the present invention can provide checks approximately every 1 millisecond or quicker and, thus, reveal that the media server 504 is utilizing CPU resources.

For example, a high-frequency interrupt component on each interrupt checks the previous contents of an IP register (Instruction Pointer register, often referred as PC register—Program Counter) which contains addresses of instructions that were interrupted by the high-frequency monitoring component. If this instruction is inside of the body of the system idle loop and/or is a low-priority computationally- and/or memory-intensive thread, the system state is treated like an "idle" state; otherwise, the system state is treated like a "busy" state (and, by looking at what process/module/component/etc. the interrupted instruction belongs to, the "busy" state can be further attributed to a specific process/module/component). Statistics of the "idle"/"busy" states collected during a given time interval are summarized and transmitted to performance monitoring/optimizing components. For instance, if an interrupt frequency was set to 1 KHz (1000 interrupts a second), and an observation time interval is set to 0.5 seconds (two readings a second), and if during one of such 0.5 second intervals out of 500 interrupts, 300 were "busy" and 200 were "idle;" high-frequency interrupt monitoring components can inform performance monitoring/optimizing components that the system utilization during the last 0.5 second period was 60% (300/500×100%=60%).

One skilled in the art will appreciate that methodologies for data processing and reporting can vary depending on specific requirements—e.g., a monitoring component can adjust reporting time periods as necessary, it can utilize more complex forms of averaging the results over time (e.g., moving exponential averaging instead of simple averaging demonstrated above), and reporting can be triggered by a specific event (e.g., CPU utilization determined according to some averaging methodology starts to exceed a given threshold, thus prompting appropriate actions from a performance optimizing component), and the like.

Although this instance of the present invention yields only an approximate result, it can be shown that, if no programs work with exactly the same frequency and duration as a timer interrupts, over very short periods of time a histogram of CPU usage by each process obtained in this manner is exceptionally close to an exact distribution with very high confidence (i.e., With a very large number of program interrupts, e.g., 1,000+ each second, and the law of "large numbers" that states that it does not matter what an actual distribution of events is if a sufficient amount of observations is obtained, results are acquired that are arbitrarily close to the actual distribution. Note that "sufficient amount" is not as large as it may seem; e.g., opinion of only 1,000 randomly selected people represents a point of view of 300,000 people with 97% confidence).

Thus, the use of a high-resolution interrupt-based measurement mechanism provided by the present invention is very efficient and very precise. In another instance of the present invention, this aspect is combined with a set of low-priority, computationally- and memory-intensive threads to give an even more accurate and precise assessment of application and system behavior during multitask processing.

Figure 6:
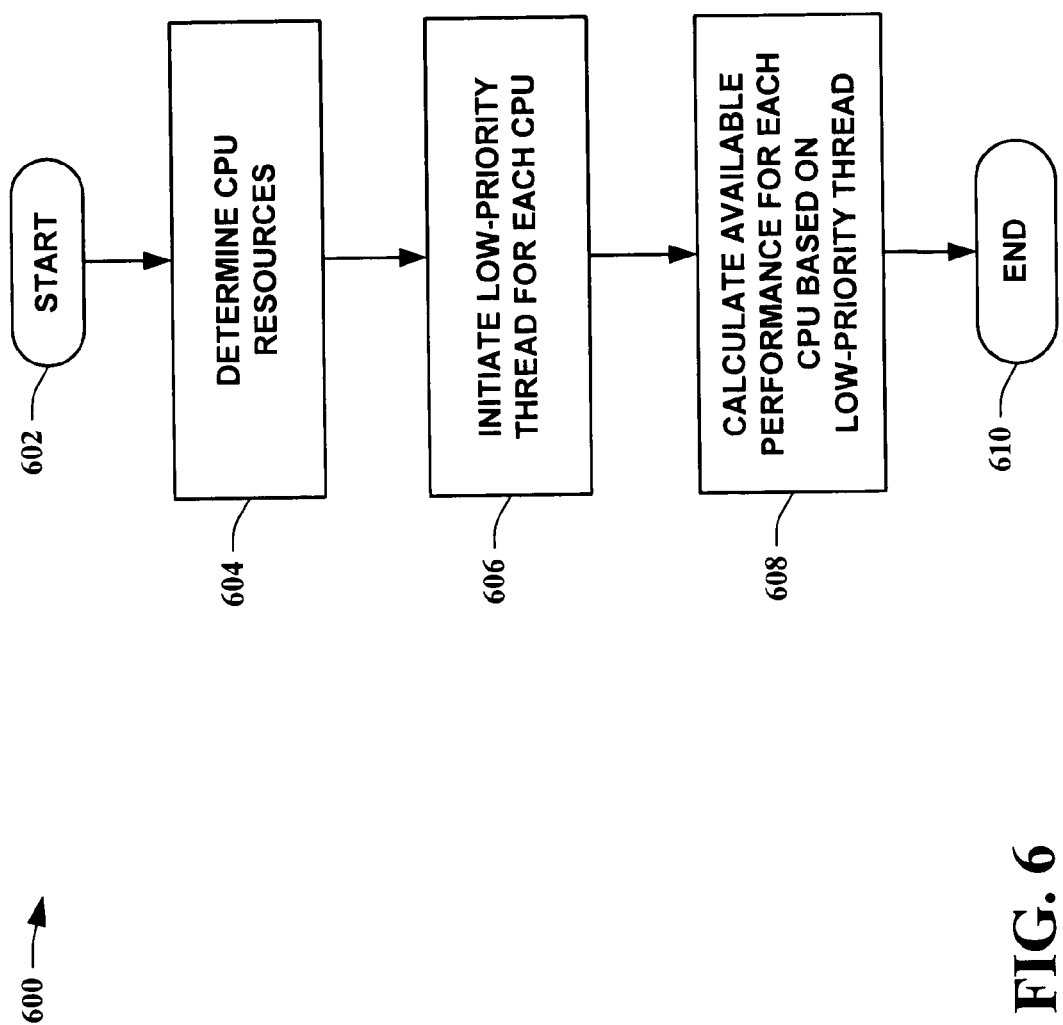
FIG. 6 is a flow diagram of a method of performance monitoring in accordance with an aspect of the present invention.
Figure 7:
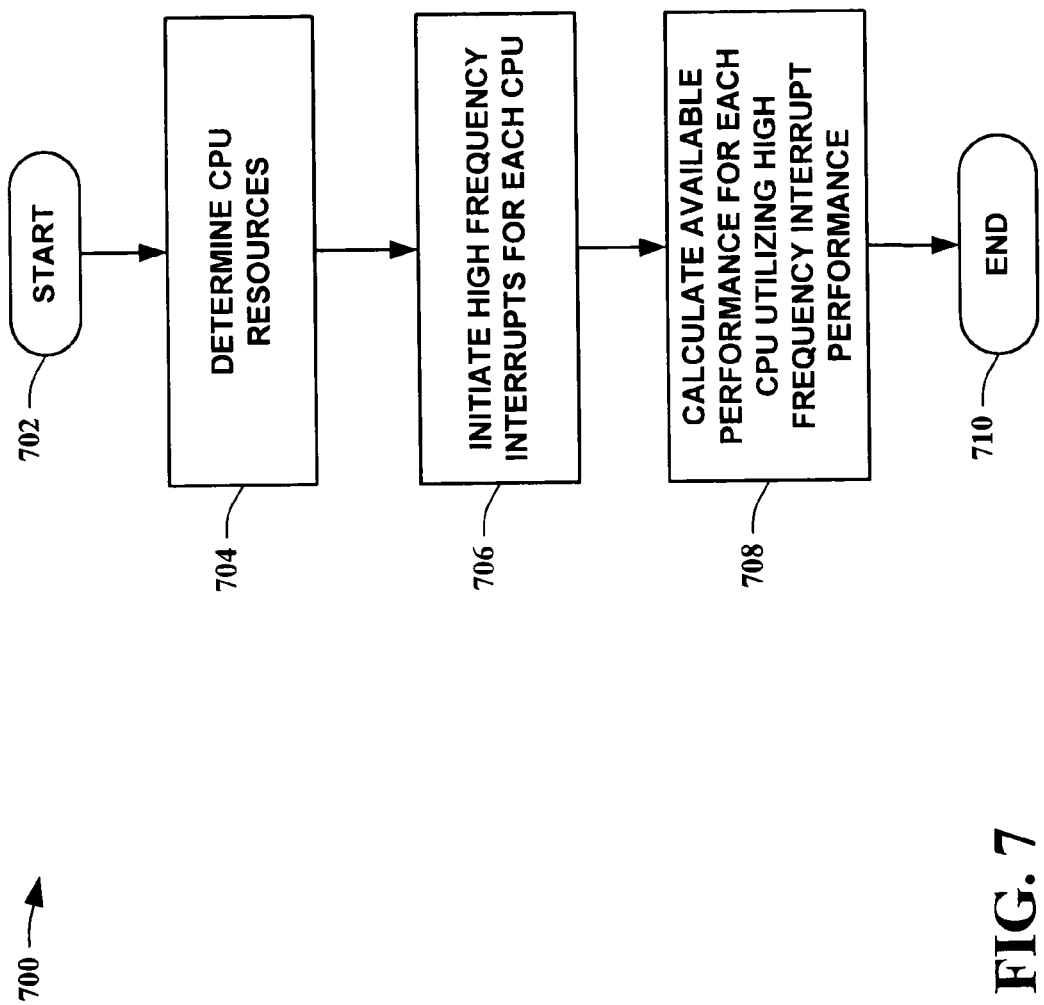
FIG. 7 is another flow diagram of a method of performance monitoring in accordance with an aspect of the present invention.
Figure 8:
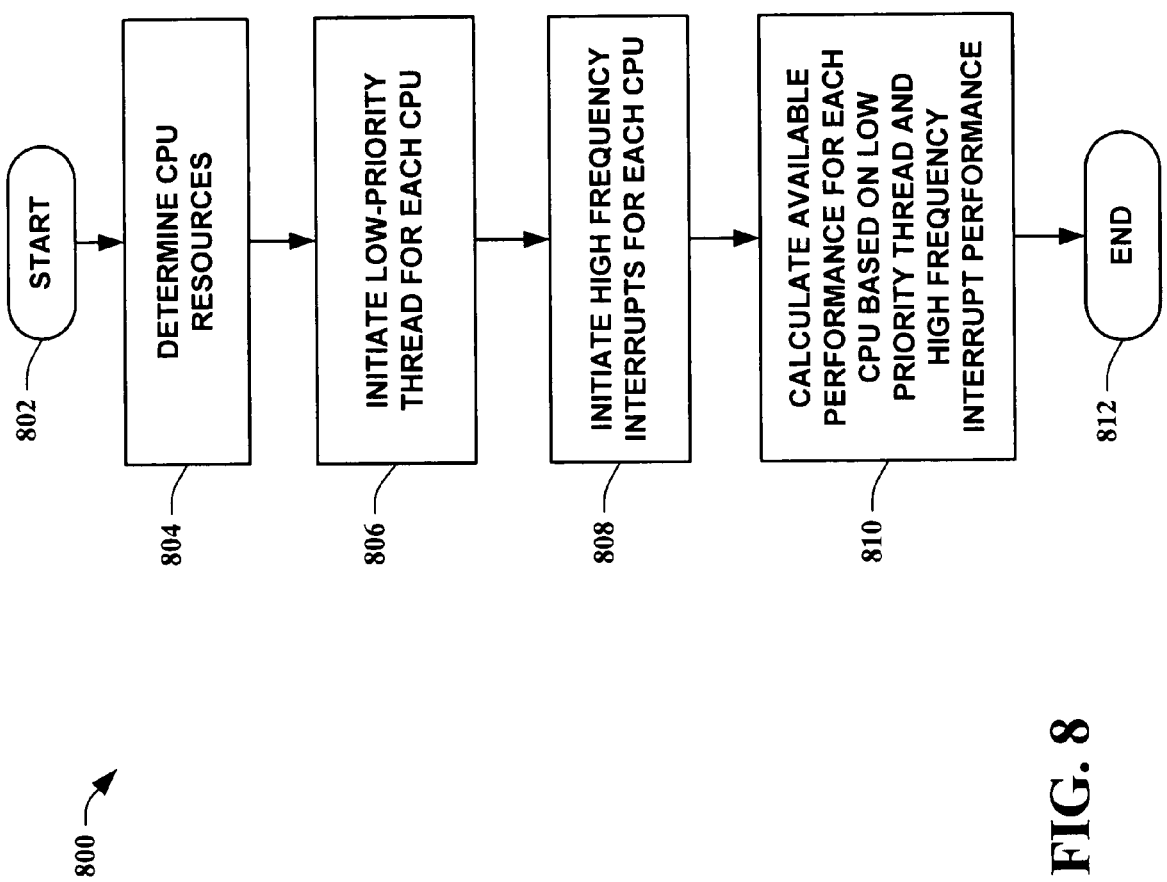
FIG. 8 is yet another flow diagram of a method of performance monitoring in accordance with an aspect of the present invention.

In view of the exemplary systems shown and described above, methodologies that may be implemented in accordance with the present invention will be better appreciated with reference to the flow charts of FIGS. 6-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 6, a flow diagram of a method 600 of performance monitoring in accordance with an aspect of the present invention is shown. The method 600 starts 602 by determining CPU resources 604. This can include, but is not limited to, number of physical and/or logical CPUs and the like. This information is generally utilized to determine what and where performance related tasks are to be directed and/or what assets are to be monitored. A low-priority thread with memory and/or computationally-intensive operations is initiated for each logical and/or physical CPU asset 606. Performance parameters are calculated for available resources for each CPU asset based on performance characteristics obtained via utilization of the low-priority thread 608, ending the flow 610. In general, the low-priority thread effectively takes the place of idle time processes that are typically utilized to measure CPU performance. The low-priority thread is much more robust and CPU and/or memory intensive and, therefore, gives a more accurate indicator of CPU available resources.

Referring to FIG. 7, another flow diagram of a method 700 of performance monitoring in accordance with an aspect of the present invention is depicted. The method 700 starts 702 by determining CPU resources 704. This can include, but is not limited to, number of physical and/or logical CPUs and the like. This information is generally utilized to determine what and where performance related tasks are to be directed and/or what assets are to be monitored. High-frequency, timer-based interrupts are then initiated for each CPU 706. The interrupts facilitate in determining if a CPU asset is being employed during periods when a normal 60 Hz clock-based system cannot determine utilization. Generally, an interrupt initiates a check to see what applications are running and if they can be interrupted to handle the interrupt request. This information about what applications are running can be employed to determine availability of CPU resources and also employed to enhance performance of applications utilizing CPU assets. Thus, available performance is calculated for each CPU utilizing the high-frequency, timer-based interrupts as a basis for determining CPU performance 708, ending the flow 710.

Turning to FIG. 8, yet another flow diagram of a method 800 of performance monitoring in accordance with an aspect of the present invention is illustrated. The method 800 starts 802 by determining CPU resources 804. This can include, but is not limited to, number of physical and/or logical CPUs and the like. This information is generally utilized to determine what and where performance related tasks are to be directed and/or what assets are to be monitored. A low-priority thread with memory and/or computationally-intensive operations is initiated for each logical and/or physical CPU asset 806. In general, the low-priority thread effectively takes the place of idle time processes that are typically utilized to measure CPU performance. The low-priority thread is much more robust and CPU and/or memory intensive and, therefore, gives a more accurate indicator of CPU available resources. High-frequency, timer-based interrupts are then initiated for each CPU 808. The interrupts facilitate in determining if a CPU asset is being employed during periods when a normal 60 Hz clock-based system cannot determine utilization. Generally, an interrupt initiates a check to see what applications are running and if they can be interrupted to handle the interrupt request. This information about what applications are running can be employed to determine availability of CPU resources and also employed to enhance performance of applications utilizing CPU assets. Performance parameters are calculated for available resources for each CPU asset based on performance characteristics obtained via utilization of the low-priority thread and the high-frequency, timer-based interrupts as a basis for determining CPU performance 810, ending the flow 812. When combined, a CPU's true idle time, resources, and burst utilization can be accurately and precisely determined, yielding a substantially more realistic CPU utilization result than obtainable without employing the present invention. One skilled in the art will appreciate that either a low-priority thread or a high-frequency interrupt can be initiated first, despite the order illustrated in the flow of FIG. 8.

Figure 9:
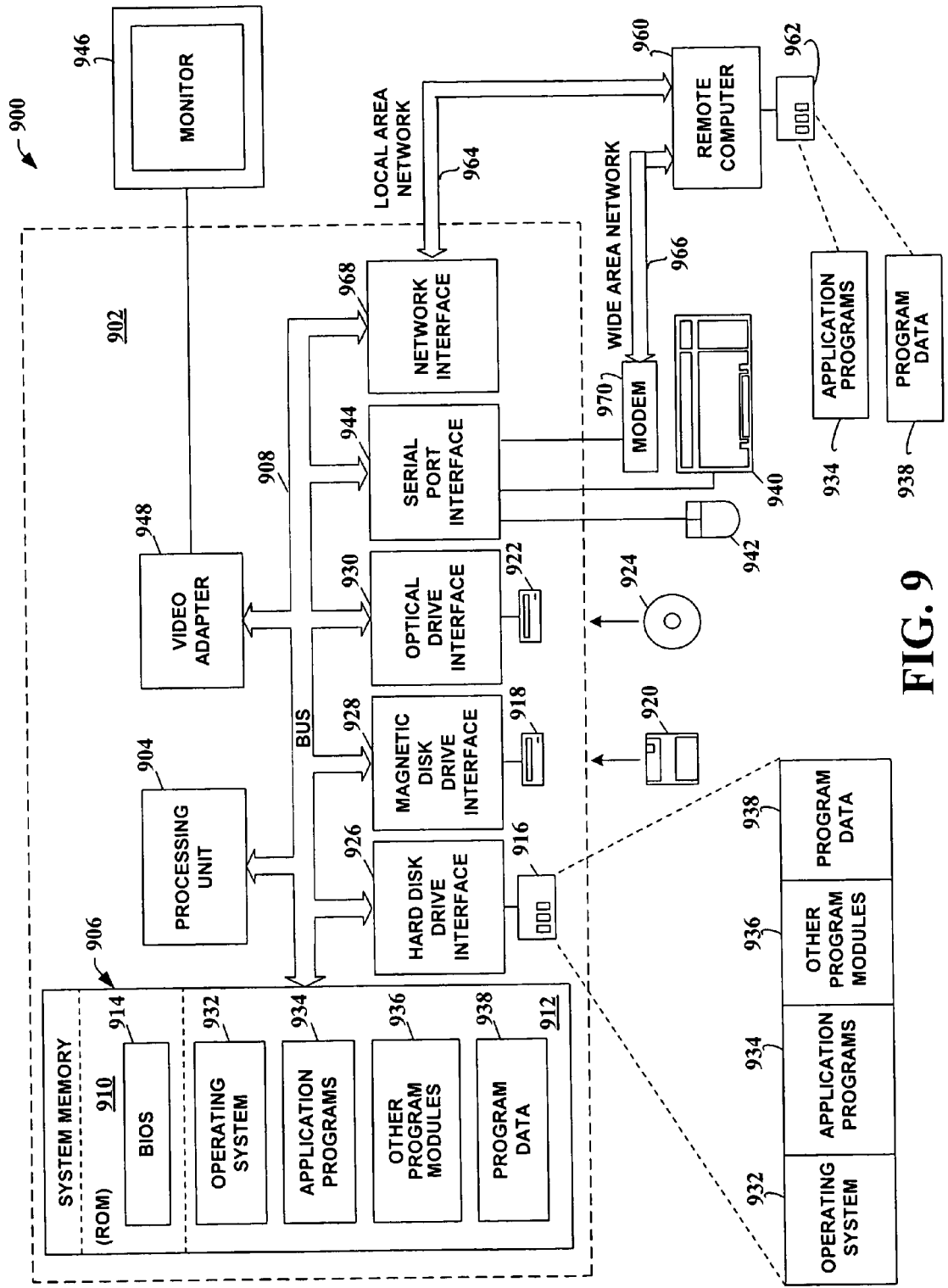
FIG. 9 illustrates an example operating environment in which the present invention can function.

In order to provide additional context for implementing various aspects of the present invention, FIG. 9 and the following discussion is intended to provide a brief, general description of a suitable computing environment 900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the present invention.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include a computing resource monitoring scheme in accordance with an aspect of the present invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment using logical connections to one or more remote computers 960. The remote computer 960 may be a workstation, a server computer, a router, a peer device or other common network node, and typically includes many or all of the elements described relative to the computer 902, although, for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary, and other means (e.g., wired or wireless) of establishing a communications link between the computers 902 and 960 can be used when carrying out an aspect of the present invention.

In accordance with the practices of persons skilled in the art of computer programming, the present invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
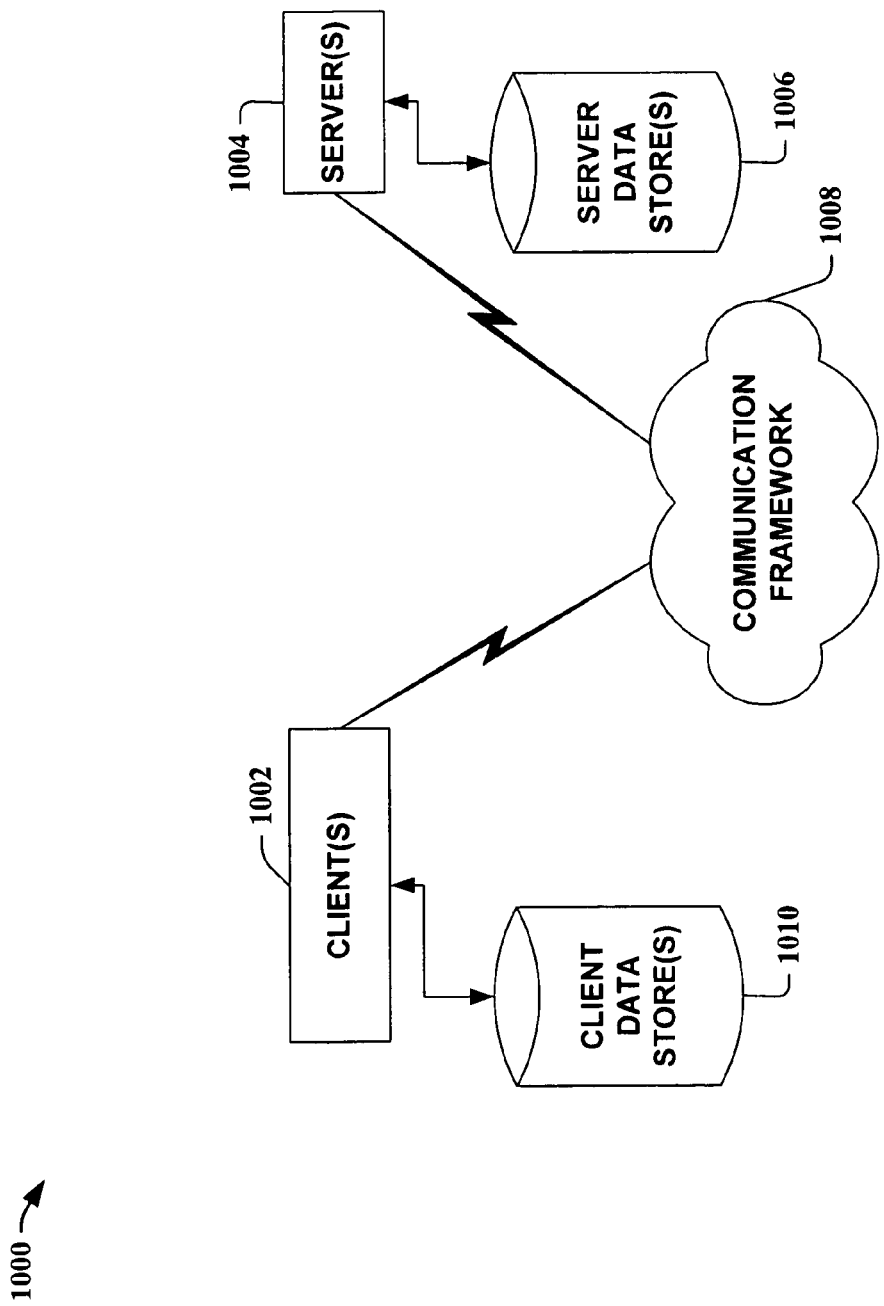
FIG. 10 illustrates another example operating environment in which the present invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The server(s) 1004 can house threads to perform transformations by employing the present invention, for example. One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

In one instance of the present invention, a data packet transmitted between two or more computer components that facilitates computing performance is comprised of, at least in part, information relating to a computing performance system that utilizes, at least in part, at least one low-priority thread with memory and/or computationally-intensive operations to determine availability of computing resources.

In another instance of the present invention, a data packet transmitted between two or more computer components that facilitates computing performance is comprised of, at least in part, information relating to a computing performance system that utilizes, at least in part, at least one high-frequency interrupt to determine availability of computing resources.

In yet another instance of the present invention, a data packet transmitted between two or more computer components that facilitates computing performance is comprised of, at least in part, information relating to a computing performance system that utilizes, at least in part, at least one low-priority thread with memory and/or computationally-intensive operations and at least one high-frequency interrupt to determine availability of computing resources.

It is to be appreciated that the systems and/or methods of the present invention can be utilized in performance facilitating computer components and non-computer related components alike. Further, those skilled in the art will recognize that the systems and/or methods of the present invention are employable in a vast array of electronic related technologies, including, but not limited to, cell phones, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented performance monitoring system, comprising:

a performance component that initiates at least one low-priority thread involving at least one computing resource and at least one high-frequency interrupt associated with at least one computing resource, the at least one low-priority thread comprising at least one of a memory-intensive operation thread or a computationally-intensive operation thread, the at least one high-frequency interrupt comprising an interrupt with a frequency of at least approximately 300 Hertz, the at least one computing resource comprising at least one of a central processing unit (CPU) or a memory resource; and a monitoring component that obtains at least one performance parameter for the at least one computing resource derived, at least in part, from at least one selected from the group consisting of the low-priority thread and the high-frequency interrupt initiated by the performance component, the monitoring component generates a report based on the at least one performance parameter upon the occurrence of a predetermined user-selected event, the at least one performance parameter comprising at least one of available CPU processing time, available memory, or available CPUs.

2. The system of claim 1, the monitoring component tracks multiple CPU performance of at least one of a virtual CPU or a physical CPU.

3. The system of claim 1, the monitoring component is at least one of a dynamically linked library (DLL) associated with an operating system or embedded into the operating system.

4. A device employing the system of claim 1 comprising at least one selected from the group consisting of a computer, a server, and a handheld electronic device.

5. A computer-implemented method for facilitating computing system performance, comprising:

executing at least one low-priority thread involving at least one computing resource and at least one high-frequency interrupt related to the at least one computing resource, the at least one low-priority thread comprising at least one selected from a group consisting of a memory-intensive operation thread and a computationally-intensive operation thread, the at least one high-frequency interrupt comprising an interrupt with a frequency of at least approximately 300 Hertz, the at least one computing resource comprising at least one of a central processing unit (CPU) or a memory resource;

obtaining at least one performance parameter for the computing resource derived, at least in part, from at least one selected from the group consisting of execution of the low-priority thread and execution of the high-frequency interrupt, the at least one performance parameter comprising at least of available CPU processing time, available memory, or available CPUs; and generating a report based on the at least one performance parameter upon the occurrence of a predetermined user-selected event.

6. An entity employing the method of claim 5 comprising at least one selected from the group consisting of a light-weight operating system, a self-tuning application, a cell phone, a personal digital assistant (PDA), a logical CPU, an application programming interface (API), a computer, a server, and a handheld electronic device.

7. A computer-implemented performance monitoring system, comprising:

a performance component that initiates at least one low-priority thread related to at least one computing resource and at least one high-frequency interrupt involving at least one computing resource, the at least one low-priority thread comprising at least one of a memory-intensive operation thread or a computationally-intensive operation thread, the at least one high-frequency interrupt comprising an interrupt with a frequency of at least 300 Hertz, the at least one computing resource comprising at least one of a central processing unit (CPU) or a memory resource; and a monitoring component that obtains at least one performance parameter for the computing resource derived, at least in part, from at least one selected from the group consisting of the high-frequency interrupt and the low-priority thread initiated by the performance component, the monitoring component generates a report based on the at least one performance parameter upon the occurrence of a predetermined user-selected event, the at least one performance parameter comprising at least one of available CPU processing time, available memory, or available CPUs.

8. The system of claim 7, a low-priority thread is initiated on each CPU associated with the system to facilitate preventing an idle loop, the CPU comprising at least one of a logical CPU or a physical CPU.

9. The system of claim 7, the monitoring component interfaces with a plurality of physical CPUs, the plurality of physical CPUs are at least one of situated on a common die or at least a portion of the physical CPUs are situated on separate dies.

10. A device employing the system of claim 7 comprising at least one selected from the group consisting of a computer, a server, and a handheld electronic device.

11. A computer-implemented method for facilitating computing system performance, comprising:

executing at least one high-frequency interrupt involving at least one computing resource and at least one low-priority thread related to at least one computing resource, the at least one high-frequency interrupt comprising an interrupt with a frequency of at least 300 Hertz, the at least one low-priority thread comprising at least one of a memory-intensive operation thread or a computationally-intensive operation thread the computing resource comprising at least one of a central processing unit (CPU) or a memory resource;

obtaining at least one performance parameter for the computing resource derived, at least in part, from at least one selected from the group consisting of execution of the high-frequency interrupt and execution of the low-priority thread, the at least one performance parameter comprising at least one of available CPU processing time, available memory, or available CPUs; and generating a report based on the at least one performance parameter upon the occurrence of a predetermined user-selected event.

12. An entity employing the method of claim 11 comprising at least one selected from the group consisting of a light-weight operating system, a self-tuning application, a cell phone, a personal digital assistant (PDA), a logical CPU, an application programming interface (API), a computer, a server, and a handheld electronic device.

13. A computer-implemented performance monitoring system, comprising:

a performance component that initiates at least one low-priority thread involving at least one computing resource and at least one high-frequency interrupt involving at least one computing resource, wherein the low-priority thread comprising at least one selected from a group consisting of a memory-intensive operation thread and a computationally-intensive operation thread, the high-frequency interrupt comprising an interrupt with a frequency of at least approximately 300 Hertz, the computing resource comprising at least one selected from the group consisting of a central processing unit (CPU) and a memory resource, and the performance parameter comprising at least one from the group consisting of available central processing unit (CPU) processing time, available memory, and available CPUs; and a monitoring component that obtains at least one performance parameter for the computing resource derived, at least in part, from at least one selected from the group consisting of the low-priority thread and the high-frequency interrupt initiated by the performance component, the monitoring component generates a report based on the at least one performance parameter upon the occurrence of a predetermined user-selected event.

14. A device employing the system of claim 13 comprising at least one selected from the group consisting of a computer, a server, and a handheld electronic device.

15. A computer-implemented method for facilitating computing system performance, comprising:

executing at least one low-priority thread involving at least one computing resource and at least one high-frequency interrupt involving at least one computing resource, wherein the at least one low-priority thread comprising at least one selected from a group consisting of a memory-intensive operation thread and a computationally-intensive operation thread, the at least one high-frequency interrupt comprising an interrupt with a frequency of at least approximately 300 Hertz, the computing resource comprising at least one selected from a group consisting of a central processing unit (CPU) and a memory resource;

obtaining at least one performance parameter for the computing resource derived, at least in part, from execution of at least one selected from the group consisting of the low-priority thread and the high-frequency interrupt, the at least one performance parameter comprising at least one selected from a group consisting of available CPU processing time, available memory, and available CPUs; and generating a report based on the at least one performance parameter upon the occurrence of a predetermined user-selected event.

16. An entity employing the method of claim 15 comprising at least one selected from the group consisting of a lightweight operating system, a self-tuning application, a cell phone, a personal digital assistant (PDA), a logical CPU, an application programming interface (API), a computer, a server, and a handheld electronic device.

17. A computer-implemented system that facilitates performance monitoring, comprising:

means for initiating at least one selected from a group consisting of at least one low-priority thread involving at least one computing resource and at least one high-frequency interrupt in at least one computing resource, wherein the at least one low-priority thread comprising at least one selected from the group consisting of a memory-intensive operation thread and a computationally-intensive operation thread, the at least one high-frequency interrupt comprising an interrupt with a frequency of at least approximately 300 Hertz, the computing resource comprising at least one selected from a group consisting of a central processing unit (CPU) and a memory resource;

means for obtaining at least one performance parameter for the computing resource derived, at least in part, from at least one selected from the group consisting of the low-priority thread and the high-frequency interrupt, the at least one performance parameter comprising at least one selected from a group consisting of available CPU processing time, available memory, and available CPUs; and means for generating a report based on the at least one performance parameter upon the occurrence of a predetermined user-selected event.

* * * * *

UNITED STATES PATENT AND TRADEMARK OFFICE
CERTIFICATE OF CORRECTION

| | | |
|---|---|---|
| PATENT NO. | : 7,421,592 B1 | Page 1 of 1 |
| APPLICATION NO. | : 10/779299 | |
| DATED | : September 2, 2008 | |
| INVENTOR(S) | : Andrew Kadatch et al. | |

It is certified that error appears in the above-identified patent and that said Letters Patent is hereby corrected as shown below:

In column 16, line 34, in Claim 11, after "thread" insert -- , --.

Signed and Sealed this

Twenty-sixth Day of April, 2011

David J. Kappos
*Director of the United States Patent and Trademark Office*